United States Patent [19]

Federspiel et al.

[11] Patent Number: 5,170,935
[45] Date of Patent: Dec. 15, 1992

[54] ADAPTABLE CONTROL OF HVAC SYSTEMS

[75] Inventors: Clifford C. Federspiel, Cambridge; Harukiko Asada, Concord, both of Mass.

[73] Assignee: Massachusetts Institute of Technology, Cambridge, Mass.

[21] Appl. No.: 799,086

[22] Filed: Nov. 27, 1991

[51] Int. Cl.$^5$ .................... G05D 23/00; G05B 13/04
[52] U.S. Cl. .................... 236/44 C; 236/91 C; 236/94; 364/151; 364/557
[58] Field of Search .................... 236/94, 91 C, 91 D, 236/91 R, 44 R, 44 C, 49.3; 62/161, 163, 164, 126, 127; 165/11.1, 12; 364/151, 148, 149, 557

[56] References Cited

U.S. PATENT DOCUMENTS

| | | | |
|---|---|---|---|
| 4,696,167 | 9/1987 | Matsui et al. | 364/151 X |
| 4,744,511 | 5/1988 | Kakehi et al. | 364/151 X |
| 4,858,824 | 8/1989 | Matsuda et al. | 236/94 |

FOREIGN PATENT DOCUMENTS

| | | | |
|---|---|---|---|
| 0091738 | 4/1987 | Japan | 236/94 |
| 0158934 | 7/1987 | Japan | 236/94 |

OTHER PUBLICATIONS

Graham C. Goodwin and Kwai Sang Sin, Adaptive Filtering Prediction and Control, pp. 91-94, c. 1984 Jan.
Fanger, P. O., Thermal Comfort, pp. 19-133, c. 1970 Jan.
"Thermal Environmental Conditions for Human Occupancy", pp. 1-17, ANSI/ASHRAE Standard 55-81, 1981.
H. Itashiki, Thermal Comfort Control for Residential Heat Pump, Residential Air Conditioning Designing Department, Daikin Industries, Ltd., Dec./1988.
J. W. MacArthur, Humidity and Predicted-Mean-Vote-Based (PMV-Based) Comfort Control, pp. 5-17, ASHRAE Transactions, Jun./1986, vol. 92, Pt. 1B.
D. G. Scheatzle, The Development of PMV-Based Control for a Residence in a Hot Arid Climate, ASHRAE Transactions, Aug./1991, vol. 97, Pt. 2.
P. E. McNall, Jr., Thermal Comfort (Thermally Neutral) Conditions for Three Levels of Activity, ASHRAE Transactions, vol. 73, May/1967.
Jan./1989 ASHRAE Handbook, Fundamentals, Physiological Principles, Comfort, and Health, Ch. 8, pp. 8.1–8.32.
Jean Colin and Yvon Houdas, Experimental Determination of Coefficient of Heat Exchanges by Convection of
(List continued on next page.)

Primary Examiner—Harry B. Tanner
Attorney, Agent, or Firm—Wolf, Greenfield & Sacks

[57] ABSTRACT

A system for providing adaptable control of an HVAC system which regulates environmental conditions within an enclosed area. In a preferred embodiment, the apparatus and method of the present invention measures selected environmental variables in the enclosed area, calculates a value of a comfort index which is a function of the values of the selected environmental variables and a plurality of parameters that predicts a thermal sensation rating of an occupant. The system receives an actual thermal sensation rating from the occupant and compares the predicted thermal sensation rating with the actual thermal sensation rating to determine a difference between the predicted thermal sensation rating and the actual thermal sensation rating. The system uses a parameter estimation process that estimates the value of at least one parameter in the plurality of parameters to reduce the difference between the predicted thermal sensation rating and the actual thermal sensation rating and then changes the value of at least one parameter, if necessary or desired. In one embodiment, the system repeats these steps until the thermal sensation rating provided by the occupant is substantially equal to neutral thermal sensation. In a preferred embodiment, the comfort index is an explicit, linearly parameterized function which represents the non-linear behavior of environmental variables.

16 Claims, 3 Drawing Sheets

OTHER PUBLICATIONS

Human Body, pp. 31–38, Journal of Applied Physics, vol. 22, May/1967.

N. Kidokoro, Development of the Fuzzy Control System for Heat for Heat Pump Air Conditioners, Mitsubishi Heavy Industries, Ltd.

Noboru Kobayashi, Masahiro Kobayashi and Shigehiro Uemura, Presentation 10 Development of a Compact Thermal Sensation Sensor, The Eleventh Symposium on Man–Thermal Environmental System, Aug./1987.

Masahiro Kobayashi, Noboru Kbayashi, Shigenhiro Uemura, Kunikazu Torikoshi and Masanori Fujiwara, Presentation 2 Development of Environmental Thermometer, the Tenth Symposium on Man–Thermal Environmental System, Aug./1986.

Masaru Ohta, Toyotaka Hirao, et al., Performance Prediction of Air to Air Heat Pumps, Mitsubishi Heavy Industries, Ltd., Oct./1989.

Max Sherman, A Simplified Model of Thermal Comfort, pp. 37–50, Energy and Buildings, vol. 8, May/1985.

S. Sugawara, A New Air-Conditioning Environmental Control Method, pp. 183–187, Energy and Buildings, vol. 14, Mar./1990.

Joseph A. Carroll, An Index to Quantify Thermal Comfort in Residential Buildings, pp. 566–576, ASHRAE Transactions, vol. 87, Pt. 1, Sep./1981.

P. O. Fanger and G. Langkilde, Interindividual Differences in Ambient Temperatures Preferred by Seated Persons, pp. 140–147, ASHRAE Transactions, vol. 81, Pt. 2, Feb./1975.

Haruyuki Fujii, Controls for Japanese Residential Heating/Air Conditioning Systems, pp. 2.35–2.42, ACEEE May 1990 Summer Study on Energy Efficiency in Buildings, vol. 2, Human Dimensions, American Council for an Energy–Efficient Economy.

A. P. Gagge et al., An Effective Temperature Scale Based on a Simple Model of Human Physiological Regulatory Response, pp. 247–262, ASHRAE Transactions, vol. 77, Dec./1971.

Noboru Kobayashi et al., Presentation 38 Experimental Evaluation of Thermal Environmental Indices and Thermal Sensation, p. 255.

X. M. Li and W. J. Wepfer, Recursive Estimation Methods Applied to a Single–Zone HVAC System, pp. 1814–1829, ASHRAE Transactions, vol. 93, Pt. 1, Jan./1987.

Arthur E. McGarity and Willett Kempton, Redesign of Air Conditioner Controls Based on a Field Study of User Behavior, ACEEE May/1988 Summer Study on Energy Efficiency in Buildings vol. 11, Behavior and Lifestyle, American Council for an Energy–Efficient Economy.

Ralph G. Nevins et al., Temperature–Humidity Chart for Thermal Comfort of Seated Persons, pp. 283–291, ASHRAE Transactions, vol. 72, Apr./1966.

G. E. Schiller, A Comparison of Measured and Predicted Comfort in Office Buildings, pp. 609–622, ASHRAE Transactions, vol. 96, Pt. 1, Apr./1990.

ADAPTABLE CONTROL OF HVAC SYSTEMS

BACKGROUND OF THE INVENTION

1. Field of the Invention

The present invention relates generally to the field of control of HVAC (heating, ventilating, and air-conditioning) systems. More particularly, the present invention relates to a method and apparatus for providing adaptable control of HVAC systems wherein the system changes its control behavior in response to input concerning the environment provided by a room occupant. The term HVAC system as used herein is meant to describe an environmental control system which performs any combination of heating, ventilating, and/or air conditioning functions.

2. Discussion of the Related Art

The fundamental goal of HVAC systems is to make room occupants comfortable. To achieve this goal, an HVAC system controller should regulate the HVAC system such that the room occupant feels thermally comfortable. Thermal comfort is defined by ASHRAE (see *Environmental Conditions for Human Occupancy*, ANSI/ASHRAE Standard 55-1981) as that condition of mind in which satisfaction is expressed with the thermal environment. Obviously, thermal comfort can be measured directly by asking the occupant how he or she feels. But thermal comfort can also be estimated objectively because of its dependence on measurable quantities of the thermal environment. Thermal comfort is primarily dependent upon whole-body thermal sensation, which at steady-state conditions is a function of the following six variables: air temperature, humidity, air velocity, clothing insulation, bodily heat production rate, and mean radiant temperature. Mean radiant temperature is defined by ASHRAE (see *Environmental Conditions for Human Occupancy*, ANSI/ASHRAE Standard 55-1981) as the uniform temperature of a radiantly black enclosure in which an occupant would exchange the same amount of radiant heat as in the actual environment.

Many HVAC systems use air temperature regulators (i.e., thermostats) to control the thermal environment and require that the room occupant adjust the set point (for example, air temperature) whenever he or she is uncomfortable. However, thermostatic control of an HVAC system only takes into account one of the variables that affects thermal comfort. The system must rely heavily on the supervisory role of the user. Whenever any of the other five variables change significantly, the room occupant may experience discomfort, and must determine a new set point air temperature to compensate for the change in the environment. Consequently, an air temperature regulator does not achieve the goal of controlling thermal comfort, since the room occupant may experience uncomfortable conditions under thermostatic control. Furthermore, air temperature regulation control suffers from a translation problem in that some occupants cannot effectively utilize the controls to compensate for changes in the environment. For example, when changing the set point air temperature in an HVAC system controlled by an air temperature regulator, the user ideally must assess his or her own thermal comfort and adjust the air temperature set point such that the correct environmental variable is changed in a manner that results in increased comfort. It is doubtful that the majority of occupants really try to do this. Furthermore, translating between changing air temperature reference and the effect this change will have on the remaining five variables which affect thermal comfort is difficult for most room occupants to contemplate.

Recently, controllers for HVAC systems have been developed that utilize somewhat more knowledge of thermal comfort. These controllers involve the use of a comfort index as the controlled output, rather than air temperature. A comfort index is used to predict a room occupant s thermal sensation rating of the environment based on one or more environmental variables such as temperature, humidity, or air velocity. A comfort index is used to calculate a predicted thermal sensation rating which rating corresponds to a particular thermal comfort level. One example of such comfort index regulators are HVAC systems which use Effective Temperature (ET*) as the controlled output. Effective Temperature is defined as the uniform temperature of a radiantly black enclosure at 50% relative humidity in which an occupant would experience the same comfort, physiological strain, and heat exchange as in the actual environment. A comfort index regulator based on ET* is described in *Thermal Comfort Control for Residential Heat Pump* by H. Itashiki, IIF-IIR Commissions, Purdue University, 1988. Another example of an HVAC control system which uses a comfort index is a system which uses Predicted Mean Vote (PMV) as the controlled output. Predicted Mean Vote is a comfort index that predicts the average thermal sensation rating of a large population when air temperature, mean radiant temperature, humidity, air velocity, clothing insulation, and rate of bodily heat production are known. See, for example, *Humidity and Predicted-Mean-Vote-Based (PMV Based) Comfort Control* by J. W. MacArthur, ASHRAE Transactions, vol. 92, Part 1B, pp. 5–17, 1986 and *The Development of PMV-Based Control for a Residence in a Hot Arid Climate* by D. G. Scheatzle, ASHRAE Transactions, vol. 97, Part 2. Predicted Mean Vote gives the thermal sensation of an "average" occupant on a bipolar psycho physical rating scale.

Although HVAC system controllers that use a comfort index as the controlled output are better able to make room occupants thermally comfortable than controllers based only on air temperature regulation, the performance of comfort index regulator controllers is limited by four important factors. A first limitation to using thermal indices for control is that they predict the thermal sensation rating of the "average" occupant. The parameters of the indices such as ET* and PMV are fit to the statistical mean of a large population. However, it is well-known that people are not alike. Values of the parameters of a comfort index which predict the thermal sensation rating of one occupant will be different than the values of the parameters which predict the thermal sensation rating of another room occupant. For example, under certain conditions, women are more than twice as sensitive as men to a change in temperature (see *Thermal Comfort (Thermally Neutral) Conditions for Three Levels of Activity* by P. E. McNall, Jr. et al., ASHRAE Transactions, vol. 73, 1967, pp. I.3.1 I.3.14). No mechanism is provided in prior art comfort index controllers to accommodate occupants who do not not fit the "average." This limitation of prior art comfort index regulators means that these controllers for HVAC systems are not "adaptable;" that is, they cannot adjust their control response to the requirements of different room occupants. In the present disclosure, the term "adaptable;" is meant to describe a control system which is able to modify its control capability, if needed or desired, to conform to differing occupant needs or requirements.

A second limitation of prior art comfort index regulators is that, in general, comfort indices such as PMV or ET* are implicit functions of the variables affecting thermal sensation. An implicit function is one which is defined by an expression in which the dependent variable and the one or more independent variables are not separated on opposite sides of an equation. Therefore, the values of these indices must be computed iteratively; that is, the operations required to find a solution to the function are repeated and each replication of the cycle produces results which approximate the desired result more and more closely. This is a problem for real time control systems, particularly if the iterative solution is not unique. Computing iterative solutions can be a relatively time consuming, computationally intensive procedure. The existence of only iterative solutions also makes control system design based on such indices difficult since design procedures generally rely on an explicit input output relationship.

A third limitation of prior art comfort index regulators is that the value of the parameters of clothing insulation and rate of bodily heat production must be known exactly to compute an accurate estimate of thermal comfort. As a practical consideration, measuring these parameters is generally inconvenient, if not impossible under certain conditions.

A fourth limitation of prior art comfort index regulators is that the measurement of the environmental variables, such as air temperature, mean radiant temperature, humidity, and air velocity must be made adjacent to the occupant in order to assure accuracy. This is not practical in most typical HVAC applications.

Therefore, an object of the present invention is to provide a comfort index which is an explicit, linearly parameterized function which represents the non-linear behavior of environmental variables, and is relatively independent of sensor location.

Another object of the present invention is to provide a controller and method of operating the controller for an HVAC system which uses a comfort index as the controlled output and provides adaptable control.

Still another object of the present invention is to provide a controller and method of operating the controller for an HVAC system such that the controller learns the environmental conditions that make a particular room occupant thermally comfortable.

Still another object of the present invention is to provide a controller and method of operating the controller for an HVAC system which uses a comfort index as the controlled output and is adaptable by changing the value of the parameters of the comfort index according to the thermal sensation ratings provided by the room occupant.

Yet another object of the invention is to provide a controller and method of operating the controller for an HVAC system which uses a comfort index as the controlled output, predicts a thermal sensation rating of a room occupant, and varies the value of the parameters of the comfort index in response to an actual thermal sensation rating provided by the room occupant in real time.

Yet another object of the present invention is to provide a controller and method of operating the controller for an HVAC system which responds to a thermal sensation rating provided by a room occupant to learn the environmental conditions that provide neutral thermal sensation to a particular room occupant.

SUMMARY OF THE INVENTION

The foregoing and other objects and advantages of the present invention are achieved in a system for providing adaptable control of an HVAC system which regulates environmental conditions within an enclosed area. In a preferred embodiment, the apparatus and method of the present invention measures selected environmental variables in the enclosed area, calculates a value of a comfort index which is a function of the values of the selected environmental variables and a plurality of parameters that predicts a thermal sensation rating of an occupant. The system receives an actual thermal sensation rating from the occupant and compares, in a preferred embodiment, the predicted thermal sensation rating with the actual thermal sensation rating to determine a difference between the predicted thermal sensation rating and the actual thermal sensation rating. The system uses a parameter estimation process, in a preferred embodiment, to estimate the value of at least one parameter in the plurality of parameters to reduce the difference between the predicted thermal sensation rating and the actual thermal sensation rating and then changes the value of at least one parameter, if necessary or desired. In one embodiment, the system repeats these steps until the thermal sensation rating provided by the room occupant is substantially equal to neutral thermal sensation. The occupant may provide actual thermal sensation ratings whenever he or she desires or the system may prompt the occupant at fixed or varying intervals. Providing actual thermal sensation ratings after attainment of environmental conditions that result in a neutral thermal sensation rating provides a form of positive feedback for the control system. In a preferred embodiment, the comfort index is an explicit, linearly parameterized function which represents the non-linear behavior of environmental variables. In a preferred embodiment the comfort index used in the present invention, V, is derived using a methodology similar to the methodology used to derive the Predicted Mean Vote.

The foregoing and other objects, features, and advantages of the present invention will be more readily understood and apparent from the following detailed description, which should be read in conjunction with the accompanying drawings, and from the claims which are appended at the end of the detailed description.

BRIEF DESCRIPTION OF THE DRAWINGS

In the drawings, in which like elements have been given the same reference characters.

DETAILED DESCRIPTION

For purposes of illustration only, and not to limit generality, the present invention will now be explained with reference to its use in controlling an HVAC system that controls the thermal environment of a particular room. However, the present invention is not so limited. The method of control of the present invention and apparatus embodying that method may be used in any enclosed space where adaptable control of HVAC systems is required, such as in space capsules, space suits, and automobiles.

Figure 1:
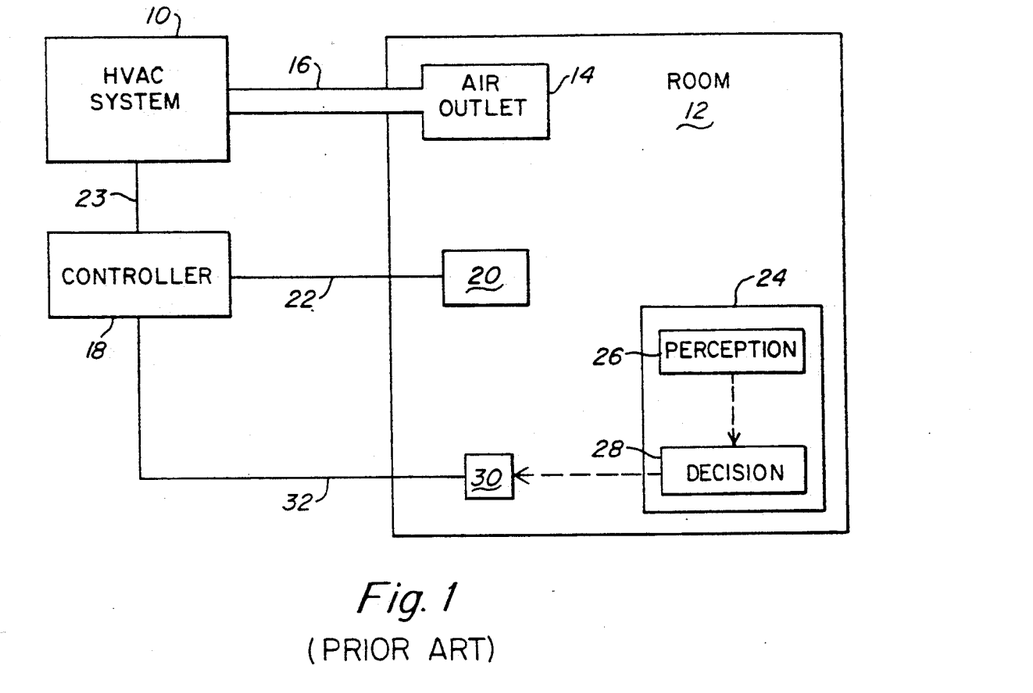
FIG. 1 is a functional block diagram of a prior art comfort index controller for an HVAC system.

Reference is now made to FIG. 1, which figure illustrates an example of a prior art comfort index controller for an HVAC system. An example of the system illustrated in FIG. 1 may be found in the HVAC system model number FTXY255FSF manufactured by Daikin Industries.

In FIG 1, the system includes an HVAC system 10 which functions to either remove or add heat to room 12. HVAC system 10 adds or removes heat from room 12 by heating or cooling the air exiting from air outlet 14 which is connected to HVAC system 10 via air ducts 16. A controller 18 is provided which controls the rate at which HVAC system 10 adds or removes heat from room 12. Environmental variable measurement sensors illustrated by block 20 are provided which measure the room variables that affect thermal comfort such as air temperature, humidity, wall temperature, and air velocity. Signals from the sensors 20 are transmitted to controller 18 over connection 22. Controller 18 controls HVAC system 10 via signals transmitted over connection 23. One skilled in the art will appreciate that although HVAC system 10, air outlet 14, and controller 18 are shown as separate components, they may be packaged in a single unit which may be entirely located in room 12.

Controller 18 operates according to a thermal sensation model based on a comfort index such as PMV or ET*. Based on the data supplied by the environmental variable measurements, controller 18 predicts what the occupant reaction will be to the measured variables by calculating a value for the comfort index. Controller 18 controls HVAC system 10 to add or subtract heat from room 12 in response to the predicted occupant reaction.

If the room occupant is uncomfortable with the control being exercised by controller 18, the room occupant cannot adjust the comfort index or the values of the parameters of the comfort index used by controller 18. The most the room occupant can do is exercise supervisory control over the set point (i.e., the air temperature setting) of controller 18.

The sequence of steps needed to control a prior art comfort index regulator is as follows. An occupant (illustrated by block 24) performs a perception step (illustrated by block 26) in which the occupant assesses his or her level of thermal comfort. This level of comfort is the occupant's thermal sensation. Based on the perceived thermal sensation, the occupant makes a decision (illustrated by block 28) as to how to manipulate the set point of controller 18 in order to achieve thermal comfort. The occupant's decision is given effect by adjusting the set point of controller 18, which usually means adjusting the air temperature setting of a thermostat 30. The new set point is then transmitted via connection 32 to controller 18. In the system illustrated in FIG. 1, the user must make the translation between a desired level of comfort and the set point of controller 18. That is, the occupant must be able to predict how a change in air temperature will affect his or her thermal comfort. However, since the occupant can only adjust the air temperature, this may or may not result in increased thermal comfort since the occupant cannot control the remaining environmental variables which affect thermal comfort.

The present invention overcomes these limitations because it uses a new comfort index which can be expressed as an explicit, linearly parameterized function which represents the non-linear behavior of the environmental variables that affect thermal comfort. The relative mathematical simplicity of the new comfort index allows for rapid and efficient adjustment of its parameters. The parameters of the new comfort index can be adjusted to more accurately predict a room occupant's perceived thermal sensation. The derivation of the comfort index used in the present invention will now be explained. The derivation resembles the analysis and method used to derive the PMV comfort index. However, significant changes concerning the models of heat transfer used and assumptions concerning the use of the control system and the behavior of the room occupant are made which will be pointed out as the derivation is explained.

Furthermore, although a preferred embodiment of the invention uses a comfort index based on the PMV analysis, the present invention is not so limited. The method and apparatus of the present invention may be applied to other controllers for HVAC systems which use other comfort indices as the controlled output.

Figure 2:
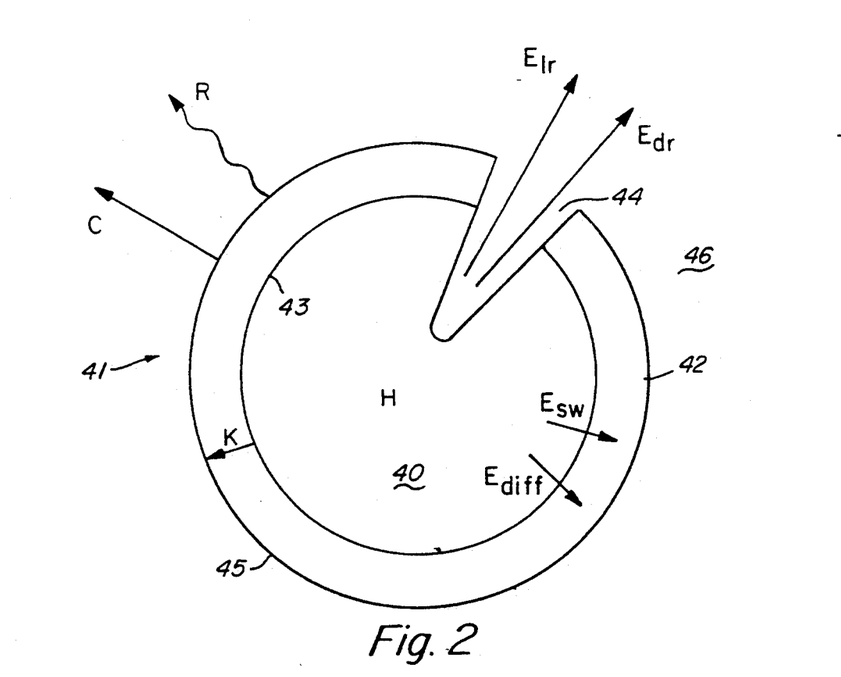
FIG. 2 is a single state lumped parameter model of the heat balance between a clothed human and the environment used to derive the comfort index of the present invention.

Reference is now made to FIG. 2, which figure illustrates a single state lumped parameter model of the heat balance (i.e., heat exchange or heat flow) between a clothed human 41 and the environment 46 used as the model of heat exchange between the room occupant and the room environment. Portion 40 represents the human body. Portion 42 represents the clothing covering the human body. Portion 44 represents the interface between the human respiratory system and the environment 46 which surrounds the human. H represents the rate of heat produced within the human body, $E_{ir}$ represents the rate of evaporative heat loss from the lungs, $E_{dr}$ represents the rate of convective heat loss from the lungs, $E_{sw}$ represents the rate of heat loss due to sweating, $E_{diff}$ represents the rate of heat loss due to diffusion of water vapor through the skin 43, K represents the rate of heat loss through the clothing 42, C represents the rate of convective heat loss from the clothing outer surface 45, and R represents the rate of radiative heat loss from the clothing outer surface 45.

The comfort index of the present invention is based on this single state, lumped parameter model of the heat balance between a clothed human body and the thermal environment. The comfort index of the present invention is most useful for steady state conditions where the human body is in a state of thermal equilibrium with the surroundings.

The first step in developing the comfort index of the present invention, which is noted as V, to describe the heat transfer between the environment and the single state, lumped-parameter model of a clothed human. Thermal equilibrium implies that the heat generated within the human body is equal to the heat dissipated from the body to the environment. As in the derivation of PMV, the heat balance between a clothed human body and the environment using the lumped-parameter model illustrated in FIG. 2 can be expressed as follows:

$$H = E_{sk} + Q_{res} + K \quad (1)$$

$$K = R + C \quad (2)$$

where:
$E_{sk}$ is the rate of evaporative heat loss from the skin per unit area
$Q_{res}$ is the rate of heat loss through respiration from the lungs per unit area The rate of bodily heat production, H, is equal to the total rate of energy production within the body minus the rate of work accomplished. This relationship is expressed as:

$$H = M(1 - \eta) \quad (3)$$

where:
M is the rate of bodily energy production
$\eta$ is the mechanical efficiency of the human body The rate of evaporative heat loss from the skin per unit area, $E_{sk}$ is expressed as the sum of the rate of heat loss due to diffusion of water vapor through the skin, $E_{diff}$, and the rate of heat loss due to sweating, $E_{sw}$.

$$E_{sk} = E_{diff} + E_{sw} \quad (4)$$

The rate of heat loss due to diffusion of water vapor through the skin, $E_{diff}$, is expressed as:

$$E_{diff} = \lambda m (p_s(T_s) - P_v) \quad (5)$$

where
$T_s$ is the skin temperature
$P_v$ is the partial water vapor pressure in the air
$\lambda$ is the heat of vaporization of water
m is the vapor permeance coefficient of skin
$P_s$ is the saturated water vapor pressure in the air The rate of heat loss due to sweating, $E_{sw}$ will be discussed later.

The rate of heat loss through respiration, $Q_{res}$ is expressed as:

$$Q_{res} = E_{lr} + E_{dr} \quad (6)$$

The rate of evaporative heat loss from the lungs, $E_{lr}$ is expressed as:

$$E_{lr} = b\lambda(W_{ex} - W_a) \quad (7)$$

where:
b is the pulmonary ventilation rate
$W_{ex}$ is the humidity mass ratio of expired air
$W_a$ is the humidity mass ratio of inspired air The rate of convective heat loss from the lungs, $E_{dr}$ is expressed as:

$$E_{dr} = bc_p(T_{ex} - T_a) \quad (8)$$

where:
$c_p$ is the specific heat of dry air at constant pressure
$T_{ex}$ is the temperature of expired air
$T_a$ is the temperature of inspired air In the derivation of PMV, the following assumptions were used in the heat balance equations:
(1) water vapor behaves as an ideal gas;
(2) the pulmonary ventilation rate, b, is proportional to bodily energy production, M;
(3) vapor pressure of air expired by the human is constant; and
(4) temperature of air expired by the human is constant.

Applying these assumptions to equations 7 and 8 results in the following simplifications:

$$E_{lr} = \gamma \beta M \lambda (p_{ex} - p_v)$$

where:
$\gamma$ is the proportionality constant relating vapor pressure to humidity mass ratio (from assumption (1) above)
$\beta$ is the proportionality constant relating M to b
$P_{ex}$ is the water vapor pressure of expired air $$(10) \quad E_{dr} = \beta M c_p (T_{ex} - T_a)$$

The rate of heat loss through the clothing, K, may be expressed as:

$$K = \frac{T_s - T_{cl}}{0.155 I_{cl}} \quad (11)$$

where:
$T_{cl}$ is the temperature of the clothing outer surface
$I_{cl}$ is the clothing insulation In the derivation of PMV, the Stephan Boltzmann law was used to describe the radiative heat transfer between the outer surface of the room occupant's clothing and the environment. According to the Stephan-Boltzmann law, the radiative heat transfer between two surfaces is proportional to the difference in the fourth power of the temperatures of the surfaces. However, for the more-limited temperature ranges encountered in an indoor-type room environment, we have determined that using a model of the radiative heat transfer between a clothed human and a room environment which is proportional to the difference in the first power of the temperatures results in a great calculational simplification while still maintaining sufficient accuracy. The use of this model results in a linear relationship between the outer surface of the occupant's clothing and the room environment. This linear radiative heat transfer relation is expressed as:

$$R = h_r(T_{cl} - T_r) \quad (12)$$

where:
$h_r$ is the linear radiative heat transfer coefficient
$T_r$ is the mean radiant temperature
as described in 1989 *ASHRAE Handbook*, Chapter 8: Physiological Principles, Comfort and Health.

Another factor which must be taken into account in the comfort index is the rate of convective heat loss from the clothing, C The rate of convective heat loss is expressed as:

$$C = f_{cl} h_c (T_{cl} - T_a) \quad (13)$$

where:
$f_{cl}$ is the ratio of the area of the clothed human body to the area of the nude human body
$h_c$ is the convective heat transfer coefficient between the clothing outer surface and the air In the derivation of PMV, the convective heat transfer coefficient was modeled as the maximum of a natural or free convection heat transfer coefficient and a forced convection heat transfer coefficient. Since the model required determining the maximum of the two coefficients, one mechanism of convective heat transfer dominated the heat transfer coefficient.

By contrast, we have determined that since the conditions in a room often result in a mixed convection where both mechanisms are active, using a model of the convective heat transfer coefficient which is the sum of the mechanisms of natural convective heat transfer and forced convective heat transfer results in a great calculational simplification while still maintaining sufficient accuracy. The convective heat transfer coefficient is expressed as:

$$h_c = h_{cn} + h_{cf} \tag{14}$$

where
$h_{cn}$ is the natural convective heat transfer coefficient
$h_{cf}$ is the forced convective heat transfer coefficient
Further, $$h_{cn} = \text{constant} \tag{15}$$

$$h_{cf} = \kappa v^{0.67} \tag{16}$$

where:
$\kappa$ is a constant
$v$ is the air velocity
as described in *Experimental Determination of Coefficient of Heat Exchange by Convection of Human Body* by J. Colin and Y. Houdas, Journal of Applied Physiology, vol. 22, pp. 31-38, 1967.

The heat balance (i.e., heat flows) at the skin surface and at the clothing outer surface, respectively, are expressed as:

$$Q_B = H - E_{sk} - Q_{res} \tag{17}$$

where: $Q_B$ is the heat balance at the skin surface of the human body $$Q_C = R + C \tag{18}$$

where: $Q_C$ is the heat balance at the clothing outer surface
By substitution from expressions 1-16 into expressions 17 and 18, $Q_B$ and $Q_C$ may be re-expressed as:

$$Q_B = M(1 - \eta) - \lambda m(p_s(T_s) - p_v) - \tag{19}$$
$$E_{sw} - \gamma \beta M \lambda (p_{ex} - p_v) - \beta M c_p (T_{ex} - T_a)$$

$$Q_c = h_r(T_{cl} - T_r) + f_{cl}(h_{cn} + h_{cf})(T_{cl} - T_a) \tag{20}$$

Once the expressions for heat balance between a clothed human body and the environment, $Q_B$ and $Q_c$, are determined, the next step in the derivation V is to determine the conditions for neutral thermal sensation. The values of skin temperature, $T_s$, and sweat rate, $E_{sw}$, which will result in neutral thermal sensation have been empirically determined (see *Thermal Comfort: Analysis and Applications in Environmental Engineering* by P.O. Fanger, McGraw Hill, 1970) and are expressed as:

$$\overline{T}_s = 35.7 - 0.0275 H \tag{21}$$

where: $\overline{T}_s$ is the skin temperature that corresponds to neutral thermal sensation $$\overline{E}_{sw} = 0.42(H - 58.2) \tag{22}$$

where: $\overline{E}_{sw}$ is the sweat rate that corresponds to neutral thermal sensation Substituting $\overline{T}_s$ for $T_s$ and $\overline{E}_{sw}$ for $E_{sw}$ into the expressions for $Q_B$ and $Q_C$ (expressions 19 and 20), yields the heat flow (i.e., heat balance) at the skin surface and at the clothing outer surface that corresponds to neutral thermal sensation. The heat flow at the skin surface that corresponds to neutral thermal sensation, $\overline{Q}_B$, is expressed as:

$$\overline{Q}_B = M(1 - \eta) - \lambda m(p_s(\overline{T}_s) - p_v) - \tag{23}$$
$$\overline{E}_{sw} - \gamma \beta M \lambda(p_{ex} - p_v) - \beta M c_p(T_{ex} - T_a)$$

In the derivation of PMV, the skin temperature that corresponds to neutral thermal sensation, $\overline{T}_s$, and the sweat rate that corresponds to neutral thermal sensation, $\overline{E}_{sw}$, were imposed at the clothing outer surface. In the present invention, we impose $\overline{T}_s$ and $\overline{E}_{sw}$ at the skin surface when determining $\overline{Q}_B$. This condition explicitly eliminates the factor of clothing temperature from the heat balance expressions, thus simplifying the expressions when compared to the case, such as in PMV, where $\overline{T}_s$ and $\overline{E}_{sw}$ are imposed at the clothing outer surface. The heat flow at the outer clothing surface that corresponds to neutral thermal sensation, $\overline{Q}_C$, is expressed as:

$$\overline{Q}_C = h_r(\overline{T}_{cl} - T_r) + f_{cl}(h_{cn} + h_{cf})(\overline{T}_{cl} - T_a) \tag{24}$$

where $\overline{T}_{cl}$, the clothing temperature that corresponds to neutral thermal sensation is expressed as:

$$\overline{T}_{cl} = \overline{T}_s - 0.155 c_l \overline{Q}_B \tag{25}$$

computing $\overline{T}_{cl}$ according to expression 25 and simplified expressions for R and C (expressions 12 and 13) results in being linearly parameterized.

If the environmental conditions satisfy:

$$\overline{Q}_b = \overline{Q}_C \tag{26}$$

then the room occupant will experience neutral thermal sensation. That is, expression 26 describes the situation where the heat flow at the skin surface equals the heat flow at the clothing outer surface. If this condition is true, then the room occupant will be in a state of thermal equilibrium with the room environment and will perceive a neutral thermal sensation (i.e., feel comfortable).

The thermal difference between the environmental conditions which produce neutral thermal sensation and the actual environmental conditions, D, is expressed as:

$$D = Q_B - Q_c \tag{27}$$

The comfort index (i.e., thermal sensation rating predictor), V, of the present invention is proportional to the thermal difference and is expressed as:

$$V = \alpha D \tag{28}$$

where:
V is a prediction of the actual thermal sensation V
$\alpha$ is a proportionality constant Three assumptions are made which allow the unknown and in some applications practically unmeasurable variables M, $I_{cl}$, and $\eta$ to be accounted for within the parameters of V. These assumptions are:

(1) bodily energy production, M, is constant;
(2) clothing insulation, $I_{cl}$ is constant; and
(3) the mechanical efficiency, $\eta$, is constant.

These assumptions are valid for many applications which use HVAC system controllers because rooms (or a particular enclosed area) are typically used for particular tasks that require a particular dress. Thus, if the room is generally used for a particular type of activity, then bodily heat production, clothing insulation, and mechanical efficiency do not vary to such an extent that special compensation is required. Since these parameters are assumed to be constant, they do not need to be measured, thus eliminating the practical problems of having to measure these variables. Substituting expressions 23-25 into expression 28, the parameterized expression for V is:

$$V = \theta_0 + \theta_1 p_v + \theta_2 T_a + \theta_3 T_r + \theta_4 v^{0.67} + \theta_5 p_v v^{0.67} + \theta_6 T_a v^{0.67} \quad (29)$$

where $\theta_0$ through $\theta_6$ are constant parameters defined as:

$\theta_0 = a((1 + 0.155I_{cl}(h_r + f_{cl}h_{cn}))(M(1 - \eta) -$ $\lambda m P_s(T_s) - E_{sw} - \gamma\beta M\lambda p_{ex} - \beta M c_p T_{ex}) -$ $T_s(h_r + f_{cl}h_{cn}))$ $\theta_1 = a\lambda(1 + 0.155I_{cl}(h_r + f_{cl}h_{cn}))(m + \gamma\beta M)$ $\theta_2 = a((1 + 0.155I_{cl}(h_r + f_{cl}h_{cn}))\beta M c_p + f_{cl}h_{cn})$ $\theta_3 = ah_r$ $\theta_4 = a\kappa((0.155I_{cl}f_{cl})(M(1 - \eta) -$ $\lambda m p_s(T_s) - E_{sw} - \gamma\beta M\lambda p_{ex} - \beta M c_p T_{ex}) - T_s f_{cl})$ $\theta_5 = 0.155 a\lambda I_{cl}f_{cl}\kappa(m + \gamma\beta M)$ $\theta_6 = a\kappa((0.155I_{cl}f_{cl}\beta M c_p) + f_{cl})$ Linear parameterization is not dependent on assumption (1), (2), and (3) above. If M, $I_{cl}$, and $\eta$ are known or can be measured rather than being constant, the value of these variables can be used when calculating the value of V and the number of parameters can be increased to correspond to an increase in the number of variables.

The comfort index, V, of the present invention, as expressed in expression 29, is an explicit, linearly parameterized function which represents the non-linear behavior of environmental variables. The non linear response of the environmental variables is due to a number of factors, the primary one being the non-linear coupling between airflow and air temperature. Linearity in parameters enables the parameters of the new comfort index to be efficiently, rapidly, and easily adjusted based on thermal sensation ratings provided by the room occupant.

When incorporated into the controller of an HVAC system, parameter tuning allows the performance of the HVAC system to be adaptable, i.e., to be tailored to the thermal response of a particular room occupant. The comfort index V gives the HVAC controller a degree of independence from environmental sensor location because an adjustment factor (for example, a proportionality constant) that compensates for sensor location can be incorporated into the parameters of V. Since clothing insulation and rate of bodily heat production do not need to be known, the computational overhead required to determine solutions for V is reduced compared to that required for PMV or ET*. The comfort index of the present invention thus overcomes the limitations of prior comfort indices, and provides the capability of adaptable control of an HVAC system.

Figure 3:
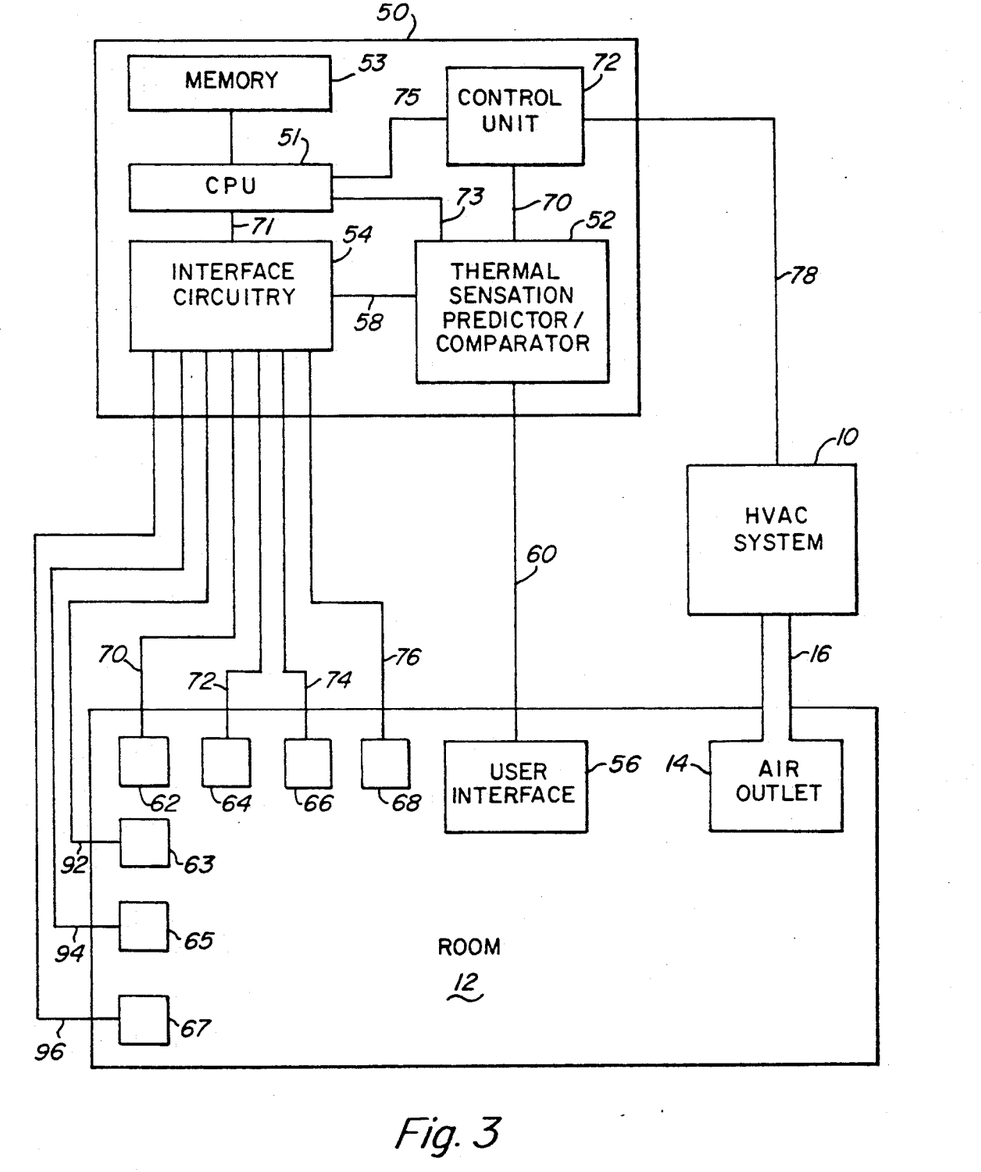
FIG. 3 is a schematic block diagram of an illustrative embodiment of the present invention.

Reference is now made to FIG. 3, which figure illustrates one embodiment of apparatus which incorporates the thermal sensation predictor of the present invention in a real time, adaptive HVAC controller. Controller 50, which may include a computer having a central processing unit 51 and associated memory 53, connected to other components of controller 50 over suitable communications links 71, 73, 75, includes a thermal sensation predictor portion 52 which receives signals from interface circuitry 54 and user interface circuitry 56 over connections 58 and 60, respectively. Memory 53 may be a combination of RAM and ROM memories. Interface circuitry 54 receives signals from environmental variable sensors 62, 63, 64, 65, 66, 67, 68 over connections 70, 92, 72, 94, 74, 96, 76, respectively. Sensor 62 senses the ambient air temperature, sensor 64 senses the ambient vapor pressure (i.e., humidity), sensor 66 senses the air velocity, and parameter sensor 68 senses the mean radiant temperature. Sensor 62 may be a thermocouple, a resistance temperature detector (RTD), or a thermistor. Sensor 64 may be a polymer capacitor type sensor. Sensor 66 may be a rotating vane sensor or a heated wire anemometer. Sensor 68 may be a globe thermometer, an infrared measuring device, or a device which combines individual temperature measurements of the surfaces of the room. Sensor 63 measures the rate of bodily heat production, sensor 65 measures clothing temperature, and sensor 67 measures the mechanical efficiency of the occupant. Sensor 63 may be a pulse rate sensor strapped to the occupant's wrist and sensor 65 may be another temperature sensor similar to sensor 62 located on, for example, a surface of a chair which contacts the occupant's clothing. The choice for sensor 67 depends on the type of work being done in the room. If the work included operating a lever, for example, sensor 67 may be a strain gauge that measures the force applied to the lever and a potentiometer, located at the pivot point, that measures the displacement. Sensors 63, 65, and 67 are not necessary to the operation of the present invention, because these environmental variables may be assumed to be constant and the system can still operate with sufficient accuracy. However, for applications in which these variables can be measured, their respective values can be incorporated into the calculation of V. Interface circuitry 54 processes the signals received from the sensors and converts these signals into a form usable by the thermal sensation predictor 52. Interface circuitry 54 may include amplifiers, anti aliasing filters, and analog to digital signal converters to allow the signals from the parameter sensors to be processed by the computer included in controller 50.

Controller 50 also receives a perceived thermal sensation rating from the room occupant. Through user interface 56, the room occupant is able to adjust the parameters of V.

Thermal sensation predictor 52, at pre-defined time intervals, calculates a value for V, based on input from sensors 62, 64, 66, 68 (and 63, 65, and 67 if applicable). The value of V is transmitted over connection 70 to a control unit 72. Control unit 72, which may be a PID controller, processes the value of V to create a control signal which is transmitted over connection 78 to HVAC system 10. The control signal controls HVAC system 10 so that energy is added to or removed from room 12. For example, if the HVAC system contains a heat pump, the control signal may vary the compressor speed, turn the compressor on or off, or vary the speed or direction of airflow leaving air outlet 14. The control signal may also control a combination of these functions to regulate the energy flow into or out of room 12.

Although shown as separate components, controller 50, HVAC system 10, duct 16, and air outlet 14 may be packaged as a single unit located in room 12.

Figure 4:
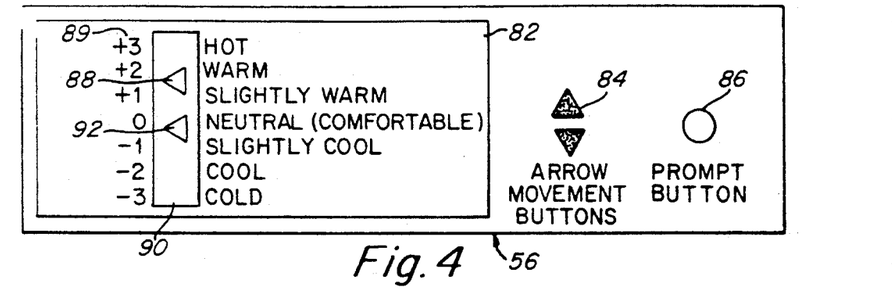
FIG. 4 is an illustrative example of a user interface that may be provided in the embodiment of the invention illustrated in FIG. 3.

Reference is now made to FIG. 4, which figure illustrates an exemplary embodiment of the user interface which enables the occupant to communicate his or her thermal sensation perception to thermal sensation predictor 52. User interface 56 may be embodied in a wall-mounted unit wired directly to controller 50 or may be a portable wireless hand held unit and connection 60 may be a wireless communications link. The user interface 56 includes a display 82, arrow movement buttons 84, and a prompt button 86. Arrow movement buttons 84 and prompt button 86, although illustrated as touch-screen type switches may also be implemented as conventional buttons on a control panel or using any other appropriate switching technique. The display 82 includes a psycho-physical thermal sensation rating scale 89 in which the occupant's thermal sensation rating from hot to cold can be correlated with a numerical value from +3 to 3. In a preferred embodiment, the thermal sensation rating scale is bipolar, but this is not a requirement. Any appropriate thermal sensation rating scale may be used, including, for example, a unipolar scale having an appropriate offset value. The system may display the predicted thermal sensation rating on scale 90 as shown by indicator 92.

To convey a perception to the controller 50, the room occupant presses prompt button 86 which signals controller 50 that the room occupant is going to transmit a signal to controller 50. Using arrow movement buttons 84, the user positions indicator 88 along scale 90 to a position which the occupant believes reflects his or her perceived thermal sensation. Thereafter, the occupant presses prompt button 86 and the rating from scale 90 is transmitted to thermal sensation predictor 52. The occupant may prompt controller 50 whenever he or she desires or controller 50 may be programmed to request a perceived thermal sensation rating from the room occupant at fixed or varying time intervals. Unlike the system illustrated in FIG. 1, in the present invention, the occupant does not translate between thermal sensation rating and a set point. The occupant does not inform controller 50 of how he or she wants to feel, but rather informs controller 50 of how he or she presently feels. Controller 50 processes the occupant's reaction to the existing environmental conditions, compares the occupant's thermal sensation perception to the calculated predicted thermal sensation, V, and then adjusts the parameters of V according to the thermal sensation rating provided by the room occupant and the environmental conditions. Based on the difference between the predicted and actual thermal sensation, controller 50 then regulates HVAC system 10 to add or remove heat from room 12 so that the room occupant will perceive neutral thermal sensation. In other words, controller 50 regulates HVAC system 10 so that the room occupant's thermal sensation rating converges to "0" on scale 89 illustrated in FIG. 4.

Figure 5:
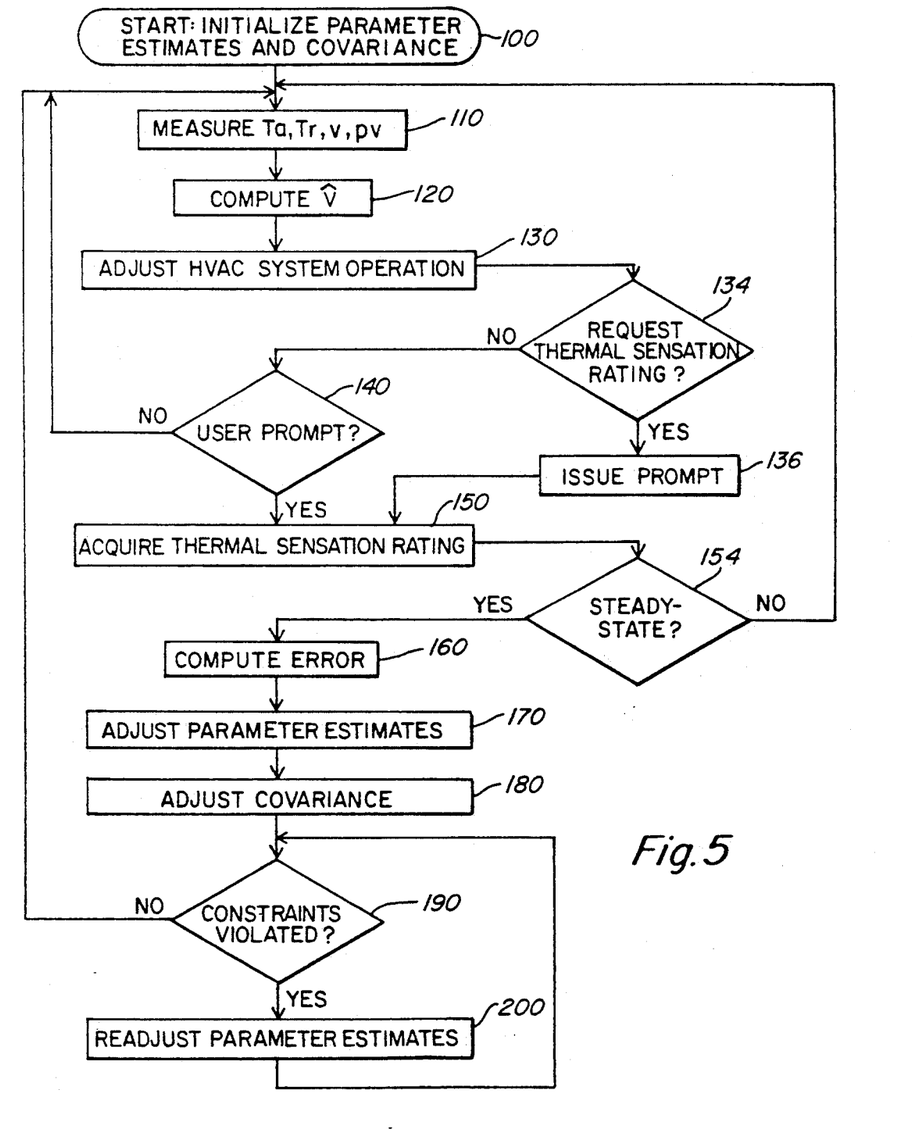
FIG. 5 is a flow chart illustrating the processing steps performed according to the method of the present invention by the controller illustrated in FIGS. 3 and 4.

Reference is now made to FIG. 5, which figure illustrates the processing steps carried out by the apparatus of FIG. 3 in order that controller 50 provide adaptable response to the thermal sensation rating of any individual room occupant in real time.

In step 100, processing begins by initialization of the estimated parameters of V and, in a preferred embodiment which uses a least-squares type of parameter estimator, initialization of the covariance matrix of the parameter estimates. The covariance may be initialized by multiplying a large constant by the identity matrix. The initial parameter estimates may be based on a statistically "average" room occupant (i.e., by using typical values of the constants which are included in the expressions for parameters $\theta_0 - \theta_6$) or by experimental determination for a particular individual or group and may be stored in the memory 53 of controller 50. From step 100, the system proceeds to step 110.

In step 110, measurements of the environmental variables of air temperature, humidity, air velocity, and mean radiant temperature are acquired from sensors 62, 64, 66, 68. If applicable, measurements of environmental sensors 63, 65, and 67 are also acquired. From step 110, the system proceeds to step 120.

In step 120, the system computes the value of V according to expression 29. From step 120, the system proceeds to step 130.

In step 130, the system adjusts the HVAC system operation in response to the value of V calculated in step 120 if any adjustment is necessary or desired. Depending on the particular HVAC system, the system may adjust compressor speed, turn the compressor on or off, or adjust the airflow to change the rate at which energy is added to or removed from the room. Changing the rate of energy flow into or out of the room can involve changing the air temperature or humidity, for example, but is not so limited. Depending on the type of HVAC system and its capabilities, any appropriate environmental variable can be manipulated to vary the rate of energy flow. If the value of V is greater than "0," then the HVAC system will be controlled to remove energy from the room. If, on the other hand, the value of V is less than "0, " then the HVAC system will be controlled to add energy to the room. For example, if the HVAC system includes a heat pump with a variable speed compressor, PID (proportional/integral/derivative) control techniques implemented in a digital computer may be used to control the speed of the compressor based on the difference between the value of V calculated in step 120 and the value of V calculated from the initial parameter estimates and values of the environmental variables or the value of V calculated from a prior execution cycle of steps 100 through 200. In another example, if the HVAC system includes a heat pump and a single speed (on/off type) compressor, a threshold control technique may be used to turn the compressor off if V negative and larger than a predetermined threshold value or to turn the compressor on if V is positive and larger than a predetermined threshold value. From step 130, the system proceeds to step 134.

In step 134, the system checks to determine if a thermal sensation rating should be requested from the room occupant. The system checks the length of time that the system has been operating, whether or not the system is at steady-state conditions, and whether or not the system has accepted a thermal sensation rating under environmental conditions similar to the present conditions. If the answer in step 134 is yes, the system proceeds to step 136. In step 136, the system issues a signal to the room occupant, such as an audible or visual signal, to request a thermal sensation rating from the room occupant. From step 136, the system proceeds to step 150.

On the other hand, if the answer in step 134 is no, the system proceeds to step 140. In step 140, the system checks to determine if the room occupant has issued a prompt through user interface 56 indicating a perceived thermal sensation rating. If the answer in step 140 is no, the system loops back to step 110 and processing continues as previously described. On the other hand, if the answer in step 140 is yes, the system proceeds to step 150.

In step 150, the system acquires, by suitable signal conversion if necessary, the perceived thermal sensation rating entered by the room occupant through user interface 56. From step 150, the system proceeds to step 154.

In step 154, the system checks to determine if the environmental conditions are at steady state by checking the time rate of change of the environmental variables. If the magnitudes of the time rates of change of the environmental variables are sufficiently small (i.e., below some predetermined threshold), then the system is at steady state. If the answer in step 154 is no, meaning that the system is not at steady-state, the system loops back to step 110 and processing continues as already previously described. On the other hand, if the answer in step 154 is yes, indicating that the environmental conditions are steady-state, the system proceeds to step 160.

In step 160, thermal sensation predictor portion 52 compares the predicted thermal sensation rating (the value of V) calculated in step 120 with the actual thermal sensation rating provided by the room occupant in step 150. The system computes the difference (i.e., error) between the predicted thermal sensation rating and the actual thermal sensation rating to generate an error value. Although this is a preferred embodiment, the system could compare the value of a function of V with the value of a function of the actual thermal sensation rating wherein the respective functions provide a relationship between the values of V and the actual thermal sensation rating and the actual values being compared. Obviously a function may be chosen so that the values being compared are the predicted thermal sensation rating and the actual thermal sensation rating. From step 160, the system proceeds to step 170.

In step 170, the system adjusts and stores the estimates of the parameters used to calculate V based on the error value from step 160. The estimates of the parameters are chosen so as to minimize the difference between the predicted thermal sensation rating and the actual thermal sensation rating. In a preferred embodiment of the invention, a recursive least squares calculation method well known to those skilled in the art is used to determine new values for the parameters of V based on the actual thermal sensation rating provided by the room occupant. The system determines the new parameters by solving $$G_n = \frac{P_o \phi}{1 + \phi^T P_o \phi}$$

$$\theta_n = \theta_o + G_n e$$

where:

$\overline{G}_n$ is the new gain vector of the parameter estimation process the subscript n refers to the new value the subscript o refers to the old value $P_o$ is the old covariance matrix $\phi$ is the vector $[1 \ p_v \ T_a \ T_r \ v^{0.67} \ v^{0.67}p_v \ v^{0.67}T_a]^T$ the superscript T refers to the transpose of the vector $\theta$ is the vector The elements of $\theta_n$ are copied to a vector $\Theta_n$ for use in a later step. Although a recursive least squares estimator has been illustrated, the system can use other convergent algorithms, such as a projection algorithm. From step 170, the system proceeds to step 180.

In step 180, the covariance of the parameter estimates calculated in step 170 is adjusted and stored. The covariance of the least-squares estimator is computed as follows $$P_n = (I - G_n)P_o$$

where: I is the identity matrix.

From step 180, the system proceeds to step 190.

For system Stability, we have determined that constants $\theta_1$, $\theta_2$, $\theta_3$, $\theta_5$, and $\theta_6$ should always be positive. Furthermore, the sum of $\theta_o$ and $\theta_4$ should always be negative since V is a bipolar index and can take on positive as well as negative values. Imposing these six constraints on the values of the parameters of V ensures system stability. Step 190 checks to make sure none of the above constraints have been violated. If the answer is no in step 190, the system loops back to step 110 and processing continues as previously described. On the other hand, if the answer in step 190 is yes, the system proceeds to step 200.

In step 200, the system readjusts the parameter estimates so that none of the constraints on $\theta_o - \theta_6$ are violated using a constrained recursive least squares calculation method such as described in *Adaptive Filtering, Prediction, and Control* by G. C. Goodwin and K. W. Sin., Prentice-Hall, 1984 in a preferred embodiment. However, other calculation algorithms, such as a constrained projection algorithm, may be used to determine the values of parameter estimates. In a preferred embodiment, the system computes $$\theta_n = (I - P_n E(E^T P_n E)^{-1} E^T)\Theta_n + PE(E^T P_n E)^{-1} E^T \epsilon$$

where:

the superscript −1 indicates a matrix inversion $\epsilon$ is a vector that defines the boundaries of the constraints $\Theta_n$ is the stored value of $\theta$ from step 170

E is the constraint matrix which contains a 1 in the $i^{th}$ row if the $i^{th}$ constraint is violated and has as many columns as the number of violated constraints $E\theta = \epsilon$ defines the constraint boundary From step 200, the system loops back to step 190 and processing continues as previously described.

The HVAC system controller of the present invention is thus able to adapt its response to environmental variables to conform to the actual response of a particular room occupant by adjusting the values of the parameters used to calculate the value of V using a parameter estimation process so that the parameters of V match the thermal response characteristics of the occupant resulting in V more accurately predicting the occupant's thermal sensation rating, rather than attempting to match a reference input (i.e., set point) to the current environmental conditions in the room. The controller of the present invention learns to predict the actual thermal sensation of a particular room occupant by tuning the parameters of V based on the thermal sensation rating provided by the room occupant. The system may prompt a room occupant at fixed intervals for a thermal sensation rating or the room occupant may provide an input to the system whenever he or she desires.

In one experiment done using the controller of the present invention, the environmental variables were measured every ten seconds and the room occupant was prompted for a thermal sensation rating every thirty minutes. The experiment demonstrated the ability of the system to adapt to a particular room occupant after only three prompts from the room occupant. After ninety minutes, the predicted thermal sensation rating was the same as the actual thermal sensation rating provided by the occupant.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. An apparatus for providing adaptable control of an HVAC system which regulates environmental conditions in an enclosed area, comprising:
   means for measuring values of selected environmental variables in the enclosed area;
   means for calculating a value of a comfort index which is a function of the values of the selected environmental variables and a plurality of parameters that predicts a thermal sensation rating of an occupant of the enclosed area;
   means for receiving an actual thermal sensation rating from the occupant;
   means for comparing a value of a function of the predicted thermal sensation rating with a value of a function of the actual thermal sensation rating to determine a difference between the predicted thermal sensation rating and the actual thermal sensation rating;
   parameter estimation means, responsive to the difference between the predicted thermal sensation rating and the actual thermal sensation rating, for estimating a value of at least one parameter in the plurality of parameters to reduce the difference between the predicted thermal sensation rating and the actual thermal sensation rating; and
   means, responsive to the parameter estimation means, for changing the value of the at least one parameter.

2. The apparatus of claim 1 wherein the means for receiving an actual thermal sensation rating from the occupant includes means for receiving a plurality of actual thermal sensation ratings and the parameter estimation means estimates the value of the at least one parameter in the plurality of parameters in response to each respective actual thermal sensation rating until the actual thermal sensation rating received from the occupant is substantially equal to neutral thermal sensation.

3. The apparatus of claim 1 wherein the comfort index comprises an explicit, linearly parameterized function that represents a non linear behavior of the selected environmental variables.

4. The apparatus of claim 1 wherein the environmental variables include an air temperature, a humidity, an air velocity, and a mean radiant temperature.

5. The apparatus of claim 4 where in the environmental variables further include a rate of bodily heat production, a clothing temperature, and a mechanical efficiency of a human body.

6. The apparatus of claim 1 wherein the comfort index, is expressed as $$V = \theta_0 + \theta_1 p_v + \theta_2 T_a + \theta_3 T_r + \theta_4 v^{0.67} + \theta_5 p_v v^{0.67} + \theta_6 T_a v^{0.67}$$

where $\theta_0$ through $\theta_6$ are constant parameters defined as:

$$\theta_0 = \alpha((1 + 0.155 I_{cl}(h_r + f_{cl}h_{cn}))(M(1 - \eta) -$$
$$\lambda m P_s(T_s) - E_{sw} - \gamma \beta M \lambda p_{ex} - \beta M c_p T_{ex}) -$$
$$T_s(h_r + f_{cl}h_{cn}))$$

$$\theta_1 = \alpha \lambda (1 + 0.155 I_{cl}(h_r + f_{cl}h_{cn}))(m + \gamma \beta M)$$

$$\theta_2 = \alpha((1 + 0.155 I_{cl}(h_r + f_{cl}h_{cn}))\beta M c_p + f_{cl}h_{cn})$$

$$\theta_3 = \alpha h_r$$

$$\theta_4 = \alpha \kappa ((0.155 I_{cl}f_{cl})(M(1 - \eta) -$$
$$\lambda m p_s(T_s) - E_{sw} - \gamma \beta M \lambda p_{ex} - \beta M c_p T_{ex}) - T_s f_{cl})$$

$$\theta_5 = 0.155 \alpha \lambda I_{cl}f_{cl}\kappa(m + \gamma \beta M)$$

$$\theta_6 = \alpha \kappa ((0.155 I_{cl}f_{cl}\beta M c_p) + f_{cl})$$

7. The apparatus of claim 1, wherein the means for receiving an actual thermal sensation rating from the occupant includes a user interface having a psychophysical rating scale and means for the occupant to register the actual thermal sensation rating via the user interface.

8. The apparatus of claim 7 wherein the psychophysical rating scale is bipolar.

9. A method for providing adaptable control of an HVAC system which regulates environmental conditions in an enclosed area, comprising:
   (a) measuring values of selected environmental variables in the enclosed area;
   (b) calculating a value of a comfort index which is a function of the values of the selected environmental variables and a plurality of parameters that predicts a thermal sensation rating of an occupant of the enclosed area;
   (c) receiving an actual thermal sensation rating from the room occupant;
   (d) comparing a value of a function of the predicted thermal sensation rating with a value of a function of the actual thermal sensation rating to determine a difference between the predicted thermal sensation rating and the actual thermal sensation rating;
   (e) estimating a value of at least one parameter in the plurality of parameters to reduce the difference between the predicted thermal sensation rating and the actual thermal sensation rating; and
   (f) changing the value of the at least one parameter in response to an estimated value of the at least one parameter.

10. The method of claim 9, further comprising repeating steps c, d, e, and f.

11. The method of claim 10, further comprising repeating steps c, d, e, and f until the actual thermal sensation rating received from the room occupant is substantially equal to neutral thermal sensation.

12. The method of claim 10, wherein the step of calculating a value of a comfort index includes calculating the value of an explicit, linearly parameterized function that represents a non linear behavior of the selected environmental variables.

13. The method of claim 10, wherein the step of measuring selected environmental variables includes measuring an air temperature, a humidity, an air velocity, and a mean radiant temperature.

14. The method of claim 13 wherein the step of measuring selected environmental variables further includes measuring rate of bodily heat production, clothing temperature, and mechanical efficiency of a human body.

15. The method of claim 11 wherein the step of calculating a value of a comfort index further comprises calculating the value of $$V = \theta_0 + \theta_1 p_v + \theta_2 T_a + \theta_3 T_r + \theta_4 v^{0.67} + \theta_5 p_v v^{0.67} + \theta_6 T_a v^{0.67}$$

where $\theta_0$ through $\theta_6$ are constant parameters defined as:

$$\theta_0 = \alpha((1 + 0.155 I_{cl}(h_r + f_{cl}h_{cn}))(M(1 - \eta) -$$

$$\lambda m P_s(T_s) - E_{sw} - \gamma \beta M \lambda p_{ex} - \beta M c_p T_{ex}) -$$

$$T_s(h_r + f_{cl}h_{cn}))$$

$$\theta_1 = \alpha \lambda (1 + 0.155 I_{cl}(h_r + f_{cl}h_{cn}))(m + \gamma \beta M)$$

$$\theta_2 = \alpha((1 + 0.155 I_{cl}(h_r + f_{cl}h_{cn}))\beta M c_p + f_{cl}h_{cn})$$

$$\theta_3 = \alpha h_r$$

$$\theta_4 = \alpha \kappa ((0.155 I_{cl} f_{cl})(M(1 - \eta) -$$

$$\lambda m p_s(T_s) - E_{sw} - \gamma \beta M \lambda p_{ex} - \beta M c_p T_{ex}) - T_s f_{cl})$$

$$\theta_5 = 0.155 \alpha \lambda I_{cl} f_{cl} \kappa (m + \gamma \beta M)$$

$$\theta_6 = \alpha \kappa ((0.155 I_{cl} f_{cl} \beta M c_p) + f_{cl})$$

16. In an HVAC system controller which predicts a thermal sensation rating of an occupant of an enclosed area by calculating a value of a comfort index which is a function of the values of selected environmental variables and a plurality of parameters that predicts thermal sensation rating of an occupant of the enclosed area and controls environmental conditions within the enclosed area in response to the value of the comfort index, the improvement comprising:

means for receiving an actual thermal sensation rating from the occupant;

means for comparing a value of a function of the predicted thermal sensation rating with a value of a function of the actual thermal sensation rating to determine a difference between the predicted thermal sensation rating and the actual thermal sensation rating;

parameter estimation means, responsive to the difference between the predicted thermal sensation rating and the actual thermal sensation rating, for estimating a value of at least one parameter in the plurality of parameters to reduce the difference between the predicted thermal sensation rating and the actual thermal sensation rating; and means, responsive to the parameter estimation means, for changing the value of the at least one parameter.

* * * * *